Figure 1:
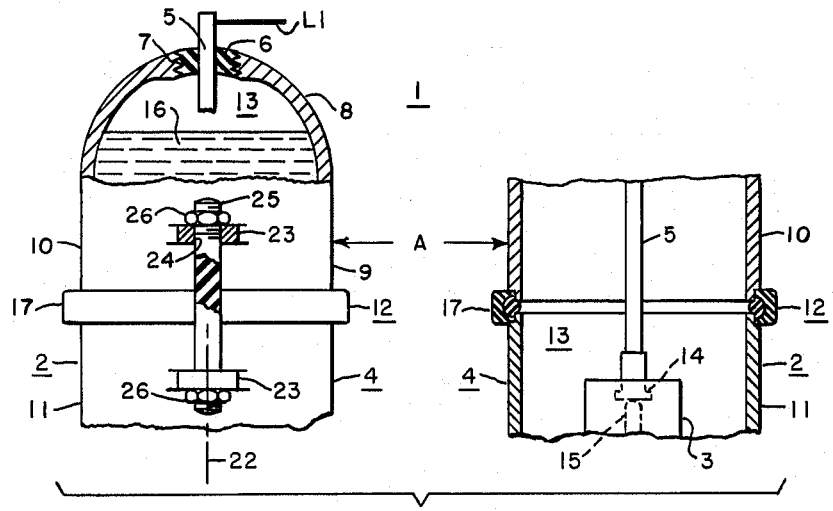

May 3, 1966     S. JÄHRIG     3,249,369

TUBE COUPLING

Filed March 22, 1962

WITNESSES
Leon J. Vaga
James F. Young

INVENTOR
Siegfried Jährig
BY
Willard R. Croût
ATTORNEY

United States Patent Office 3,249,369
Patented May 3, 1966

3,249,369
TUBE COUPLING
Siegfried Jährig, Berlin, Haselhorst, Germany, assignor to Siemens-Schuckertwerke Aktiengesellschaft, Erlangen, Germany, a corporation of Germany
Filed Mar. 22, 1962, Ser. No. 181,559
Claims priority, application Germany, Mar. 30, 1961, S 73,255
3 Claims. (Cl. 285—53)

This invention relates to tube couplings in general, and, more particularly, to tube couplings for mechanically coupling a pair of adjoining tube sections in a leak-type manner. A general object of the present invention is to provide an improved tube coupling involving few parts and providing proper tube alignment, with a minimum of lateral play between adjoining tube sections.

A further object of the present invention is the provision of an improved leak-type tube coupling for maintaining a pair of adjoining tube sections in compressive alignment.

There frequently occurs in the construction of electrical apparatus the problem of properly centering two adjoining tube sections with refernce to each other. In addition, frequently the abutting joint must also be sealed. Particularly, in the case of liquid-poor power circuit breakers, such as set forth in United States Patent 2,261,712, it becomes necessary to center the breaker head, located upon the interrupting chamber, and the lower mechanism compartment for operation of the contacts. In addition, the joint between such tube sections must be sealed in order to prevent the leaking of the extinguishing medium exteriorly of the casing structure. Such a seal must be highly pressure resistant and rugged, because under some circumstances there exists a rather high pressure within the breaker casing. As a result, so far the solution to this problem has not been entirely satisfactory because of the necessary expenditure of material and production time, as well as of the space requirements, which are considerable in the case of prior-art tube couplings.

It is, of course, know that for centering two tube-like insulating parts, which serve as a compressed-air conduit, there may be employed a centering ring, which is located between the two confronting surfaces of adjoining tube sections. In many cases according to the prior art, the centering ring has an inwardly-extending flange portion, which forms a supporting surface for a U-shaped gasket ring, the latter being arranged between the two confronting surfaces of the tube sections. The distance between the two confronting end surfaces of both tube sections is, accordingly, determined by the aforesaid metallic inwardly-extending flange portion, which not only surrounds the ends of the tubes, but also may extend between their confronting edges. As a result, the centering ring, according to the prior art, generally determines only the position of the tubes with respect to a radial direction.

According to one feature of the present invention, the area of contact is so constructed that both tube sections are provided externally thereof adjacent the confronting edges thereof with offsets, which engage the centering ring of the improved tube coupling of the present invention. In addition, the centering ring of the present invention is preferably provided with a recess, within which is disposed a gasket ring made of a resilient material, such as a synthetic rubber, such as neoprene, or the like. The gasket is so arranged that it is deformed by the confronting surfaces of both tube sections. As a result, according to the present invention, the tube sections are not only located by the centering ring in an axial direction, but are also properly located with respect to a radial direction as well. Also, the position of the resilient gasket is determined by the centering ring, which is located externally thereof. The sealing pressure is independent of excessive internal pressure, which may exist, at times, because of circuit-breaker interruptions, since it is determined essentially by the force, which is produced by the deformation of the elastic material.

In accordance with another feature of the present invention, there may be used to advantage a gasket comprising a simple ring of elastic cord. In such cases, it is recommended to make the recess within the centering ring of approximately semi-circular cross-section. The radius of the half-circle so selected is approximately equal to the radius of the cross-sectional area of the circular section of the round cord. Furthermore, it may be of advantage to design the ring and the offsets of the two tube sections symmetrically with respect to the plane of the two contacts surfaces.

Figure 2:
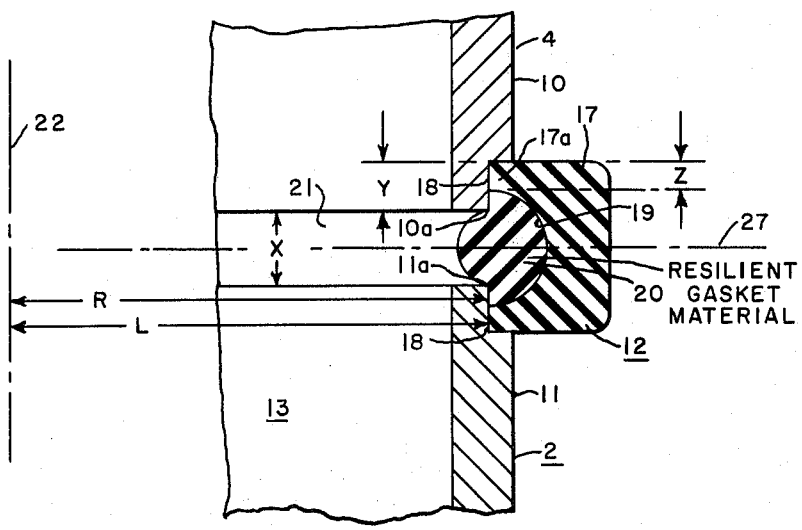

Further objects and advantages will readily become apparent upon reading the following specification, taken in conjunction with the drawing, in which:

FIGURE 1 illustrates a pair of upstanding pole-units associated with a three-phase oil-poor circuit interrupter, the second pole-unit being illustrated in vertical section, and both pole-units embodying the tube coupling of the present invention; and, FIG. 2 illustrates in an enlarged fragmentary manner the improved tube coupling of the present invention.

Referring to the drawings, and more particularly to FIG. 1 thereof, the reference numeral 1 generally designates a three-phase three-pole circuit interrupter of the oil-poor type. Each pole-unit 2 serves to interrupt the circuit extending through one phase conductor, such as the line $L_1$, of the three-phase circuit. As well known by those skilled in the art, suitable mechanism, not shown, is provided to effect simultaneous actuation of the contact structures within the three pole-units 2. For the purpose of understanding the present invention, however, it is not necessary to describe the particular details of the interrupting units 3 disposed interiorly within each of the casing structures 4 associated with the pole-units 2. Generally, the line connection $L_1$ is attached to a terminal stud 5, which extends through a bushing structure 6 suitably secured, as by a threaded connection 7, to the upper interrupter head 8 of the pole-unit 2. As shown in FIG. 1, the interrupter head 8 has a lower tubular portion 9 constituting one of two tube sections 10, 11, which preferably are detachably secured together by a tube coupling 12, the construction of which constitutes the essential features of the present invention.

With reference to FIG. 1, it will be noted that the conductor stud 5 extends downwardly into the interior 13 of the tube sections 10 and 11, and at its lower end is connected to a relatively stationary contact structure 14 associated with the interiorly-disposed interrupting unit 3. As well known by those skilled in the art, a suitable movable contact rod 15 makes separable engagement with such relatively stationary contact structure 14 and draws an arc, not shown, during circuit interruption within the interrupting unit 3 to effect extinction of the arc therein.

Preferably the lower tube section 11 is, as was the case of the upper tube section 10, formed of a suitable metallic material, and constitutes the casing means 4 for containment of a suitable arc-extinguishing liquid 16, in this particular instance circuit-interrupting oil.

As illustrated more clearly in FIG. 2 of the drawing, a centering ring 17, composed preferably of insulating material, is provided between the two tube sections 10, 11, and has an inner portion 17a which seats within a pair of recesses, or offsets 18 provided at the confronting surfaces of the two tube sections 10, 11. The offsets 18 may be symmetrical about the center line 27 of the joint. It is to be noted that the centering ring 17 has provided therein a semi-circular recess 19, within which is disposed an annular gasket core 20.

Preferably, the external diameter of the step 18, designated by the reference numeral R, is, disregarding a small clearance, of the same dimension as the inside diameter L of the centering ring 17 from the center line 22 of the breaker. As a result, the two tube sections 10, 11 are, by means of such centering ring 17, firmly held with respect to a radial direction in a proper position relative to each other. Furthermore, the centering ring 17 determines the axial distance X between the confronting surfaces 10a, 11a of the tube sections 10, 11.

Preferably the depth Y of the offsets 18 is greater than the width Z of the bearing surfaces of the centering ring 17, which are in contact with the tube sections 10, 11. Because of this, the edges 10a, 11a of the tube sections 10, 11, respectively, protrude into the originally round cross section of the resilient gasket 20. As a result, the resilient gasket 20 is deformed, because it is made of an elastic material such as a synthetic rubber, such as neoprene, for example, and is forced into the gap 21 between the confronting surfaces 10a, 11a of the tube sections 10, 11. This arrangement results in considerable pressure, which ensures a good leak-proof seal.

As was mentioned previously, preferably the centering ring 17 is made of a suitable insulating material. The metallic breaker head 8 is therefore electrically separated from the lower metallic tube part 11 associated with the interrupting unit 3. Because of this, at this location there may be introduced into the current circuit, for example, a primary release, such as a trigger. Furthermore, the centering ring 17, being made of an insulating material, has the additonal advantage inasmuch as the distance A (FIG. 1) between the pole-columns or pole-units 2 is determined solely by the dielectrc strength between the tube sections 10, 11 themselves, and not by the extended centering rings 17.

As well known by those skilled in the art, the tube sections 10, 11 may be pressed inwardly toward each other by conventional means. For this purpose there may be employed, for example, insulating tie-rods disposed interiorly of the casing means 4. However, other constructions may, of course, be employed. For example, the tube sections 10, 11 may be provided with confronting radially-outwardly-extending flange portions, not shown, having a plurality of circumferentially-spaced mounting holes, through which a plurality of bolts and cooperating nuts may be located. However, as shown in FIG. 1, to enable a maximum dielectric distance to be interposed in the spacing A between the pole-units 2, there may be provided integrally formed lug portions 23 cast integrally with the metallic tube sections 10, 11 and having bores 24 provided therethrough. Insulating tie-rods 25 and nuts 26 may be employed to compress the two tube sections 10, 11 toward other. As a result, the breakdown distance between the pole columns 2 is not affected since the lug portions 23 are positioned away from the space A between the pole-units 2.

With reference to FIG. 2, it will be noted that with the improved tube coupling arrangement 12 of the present invention that the cross-sectional area internally of the tube sections 10, 11 in the vicinity of the joint 21 is, by an application of the present invention, available to a greater extent, because, with the illustrated construction, there are no parts present within the tube sections 10, 11, that is protruding inwardly from the gap 21.

Although there has been illustrated and described a specific tube coupling, it is to be clearly understood that the same was merely for the purpose of illustration, and that changes and modifications may readily be made therein by those skilled in the art, without departing from the spirit and scope of the invention.

I claim as my invention:

1. A tube coupling including a pair of aligned tube sections, the confronting ends of the tube sections being provided with offsets, a centering ring disposed within the two offsets for limiting radial movement of the tube sections relative to each other and axially spacing the ends of the tube sections from each other, the centering ring having an annular recess provided therein on the inside surface thereof, the annular recess being semicircular in cross-section and having a diameter substantially greater than the distance the ends of the tube sections are spaced from each other by the centering ring, a ring-shaped gasket of resilient material disposed within said annular recess, the ring-shaped gasket being round in cross-section and having a normal diameter substantially the same as the diameter of the annular recess, and means forcing the two tube sections axially toward each other, whereby the ring-shaped gasket is deformed by the confronting extremity edges of the tube sections and is forced into sealing engagement with both said confronting edges, the gasket while deformed also providing sealing engagement with the outside wall surfaces of the tube sections adjacent said confronting extremity edges.

2. A tube coupling including a pair of aligned tube sections, the confronting ends of the tube sections being provided with offsets, a centering ring disposed within the two offsets for limiting radial movement of the tube sections relative to each other and axially spacing the ends of the tube sections from each other, the centering ring having an annular recess of semicircular cross-section provided therein on the inside surface thereof, the width of the annular recess being greater than the axial distance the ends of the tube sections are spaced from each other by the centering ring, a ring-shaped gasket of resilient material disposed within said annular recess, the gasket of resilient material being substantially circular in cross-section and having a diameter substantially equal to the width of the annular recess, and means forcing the two tube sections axially toward each other whereby the ring-shaped gasket is deformed by the confronting extremity edges of the tube sections, the deformed gasket providing sealing engagement with the confronting extremity edges of the tube sections and providing sealing engagement with the outside walls of the tube sections adjacent the confronting extremity edges, the deformed gasket of resilient material being held by axial and radial forces from displacement out of the annular recess.

3. A tube coupling including a pair of aligned tube sections, the confronting ends of the tube sections being provided with offsets, each including a wall surface substantially perpendicular to the axis of the tube section and having a tubular wall portion of reduced outer diameter extending from the substantially perpendicular wall to the end of the tube section, and insulating centering ring disposed within the two offsets for limiting radial movement of the tube sections relative to each other and axially spacing the ends of the tube sections from each other, the centering ring having side walls substantially perpendicular to the longitudinal axis of the tube section and engaging said wall surfaces of the tube sections, the centering ring having an annular recess therein on the inside surface thereof at substantially equal distances from both side walls of the centering ring, the annular recess having a wall which is semicircular in cross-section, a ring-shaped gasket of resilient material disposed within and completely filling said annular recess, said ring-shaped gasket being round in cross section, and means forcing the two tube sections axially toward each other, the axial length of said tubular wall portion of each tube section being greater than the axial bearing surface of the centering ring upon the tubular wall portion whereby the ring-shaped gasket is deformed by the confronting extremity edges of the tube sections and makes sealing engagement with said confronting edges, the deformed gasket also making sealing engagement with the outside walls of the tube sections.

(References on following page)

References Cited by the Examiner

UNITED STATES PATENTS

| | | | |
|---|---|---|---|
| 235,384 | 12/1880 | Russell et al. | 285—363 |
| 581,050 | 4/1897 | Wentz | 285—369 |
| 873,215 | 12/1907 | Davis | 285—53 |
| 1,035,810 | 8/1912 | Osborne | 285—363 |
| 1,106,572 | 8/1914 | Loepsinger | 285—53 |
| 2,041,316 | 5/1936 | Bennett | 285—112 |
| 2,490,333 | 12/1949 | Basham | 285—235 |
| 2,871,036 | 1/1959 | Goodman | 285—354 |

FOREIGN PATENTS

| | | |
|---|---|---|
| 367,004 | 1/1923 | Germany. |
| 944,482 | 6/1956 | Germany. |
| 1,115 | 1/1892 | Great Britain. |
| 542,716 | 5/1956 | Italy. |

CARL W. TOMLIN, *Primary Examiner.*

T. F. CALLAGHAN, *Assistant Examiner.*